(12) United States Patent
Chakrabarti et al.

(10) Patent No.: US 8,054,032 B2
(45) Date of Patent: Nov. 8, 2011

(54) DISCONTINUOUS PULSE WIDTH MODULATION FOR DOUBLE-ENDED INVERTER SYSTEM

(75) Inventors: Sibaprasad Chakrabarti, Torrance, CA (US); Gregory S. Smith, Woodland Hills, CA (US); James M. Nagashima, Cerritos, CA (US); Brian A. Welchko, Torrance, CA (US); Milun Perisic, Torrance, CA (US); George John, Cerritos, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 747 days.

(21) Appl. No.: 12/106,868

(22) Filed: Apr. 21, 2008

(65) Prior Publication Data

US 2009/0034303 A1 Feb. 5, 2009

Related U.S. Application Data

(60) Provisional application No. 60/952,776, filed on Jul. 30, 2007.

(51) Int. Cl.
*H02P 27/04* (2006.01)
(52) U.S. Cl. ........ 318/801; 318/766; 318/113; 318/139; 363/71; 363/133; 180/65.1; 180/65.21; 180/65.29; 180/65.245
(58) Field of Classification Search .................. 318/801, 318/766, 113, 139; 363/71, 133; 180/65.1, 180/65.21, 65.29, 65.245
See application file for complete search history.

(56) References Cited

U.S. PATENT DOCUMENTS

| | | | |
|---|---|---|---|
| 5,389,749 A | | 2/1995 | Hokari et al. |
| 5,912,813 A | * | 6/1999 | Kerkman et al. ............... 363/98 |
| 6,023,417 A | * | 2/2000 | Hava et al. ...................... 363/41 |
| 7,130,205 B2 | | 10/2006 | Peng |
| 7,154,237 B2 | | 12/2006 | Welchko et al. |
| 7,199,535 B2 | | 4/2007 | Welchko et al. |
| 7,439,697 B2 | * | 10/2008 | Miyazaki et al. ........ 318/400.41 |
| 2009/0033251 A1 | * | 2/2009 | Perisic et al. .................. 318/105 |
| 2009/0033274 A1 | * | 2/2009 | Perisic et al. .................. 318/771 |

OTHER PUBLICATIONS

Singh, G.K., "Multi-Phase Induction Machine Drive Research—A Survey," Elsevier Science B.V., Electric Power Systems Research, 2002, pp. 139-147.
Peng, Fang Zheng, "Z-Source Inverter," IEEE Transactions on Industry Applications, Mar./Apr. 2003, vol. 39, No. 2, pp. 504-510.
Jones, Martin et al., "A Six-Phase Series-Connected Two-Motor Drive With Decoupled Dynamic Control," IEEE Transactions on Industry Applications, Jul./Aug. 2005, vol. 41, No. 4, pp. 1056-1066.

(Continued)

*Primary Examiner* — Bentsu Ro
*Assistant Examiner* — Erick Glass
(74) *Attorney, Agent, or Firm* — Ingrassia Fisher & Lorenz P.C.

(57) ABSTRACT

Systems and methods are provided for controlling a double-ended inverter system having a first inverter and a second inverter. The method comprises determining a required output current and determining a desired second inverter current. The method further comprises determining a second inverter switching function, wherein only a selected leg in the second inverter is modulated at a duty cycle, determining a first inverter switching function based on the second inverter switching function, and modulating the first inverter and the second inverter using the first inverter switching function and the second inverter switching function.

20 Claims, 10 Drawing Sheets

OTHER PUBLICATIONS

Welchko, Brian A., "A Double-Ended Inverter System for the Combined Propulsion and Energy Management Functions in Hybrid Vehicles with Energy Storage," The 31st Annual Conference of the IEEE Industrial Electronics Society, IECON '05, Raleigh, North Carolina, Nov. 6-10, 2005, pp. 1-6.

Levi, Emil et al., "A Series-Connected Two-Motor Six-Phase Drive With Induction and Permanent Magnet Machines," IEEE Transactions on Energy Conversion, Mar. 2006, vol. 21, No. 1, pp. 121-129.

Hava, Ahmet M. et al., A High-Performance Generalized Discontinuous PWM Algorithm, IEEE Transactions on Industry Applications, Sep./Oct. 1998, 1059-1071, vol. 34, No. 5.

* cited by examiner

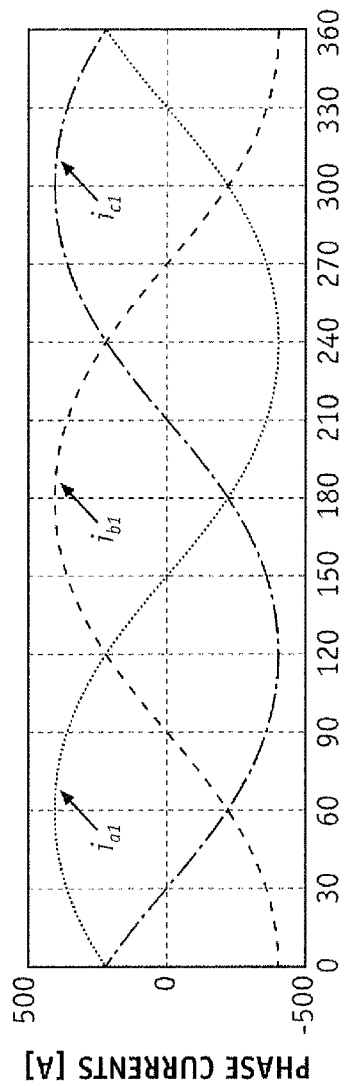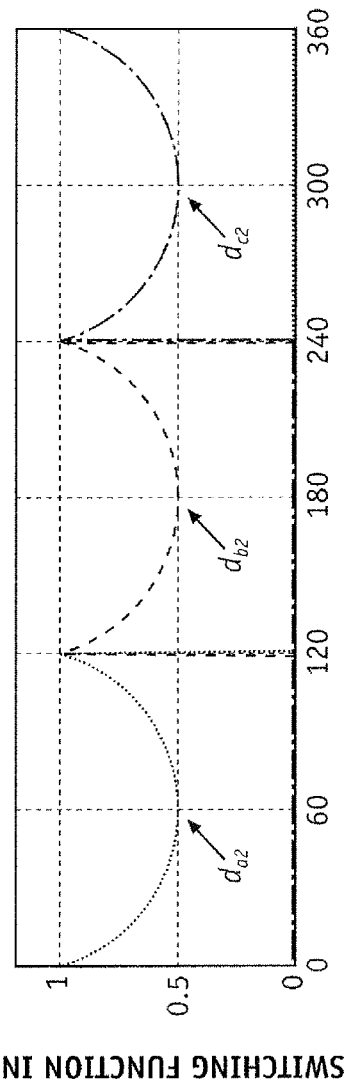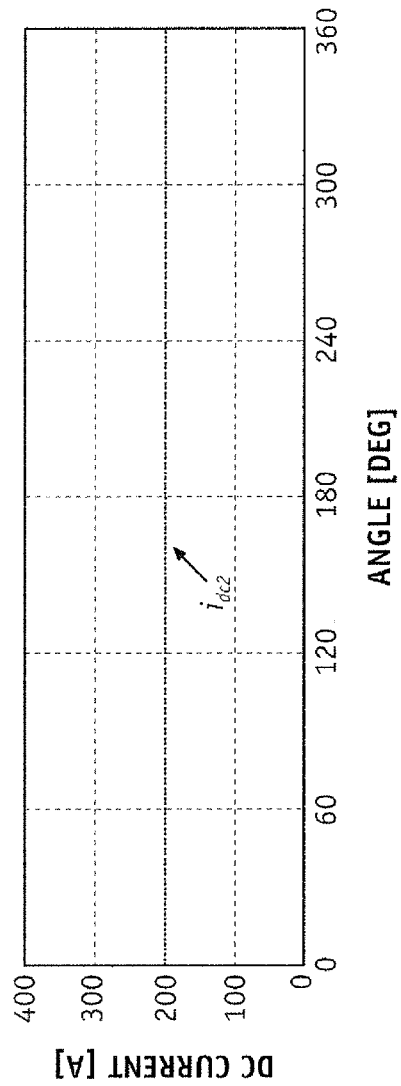
FIG. 5
FIG. 6
FIG. 7

DISCONTINUOUS PULSE WIDTH MODULATION FOR DOUBLE-ENDED INVERTER SYSTEM

CROSS-REFERENCE TO RELATED APPLICATION(S)

This application claims the benefit of U.S. provisional patent application Ser. No. 60/952,776, filed Jul. 30, 2007. The entire content of this provisional application is incorporated by reference herein.

TECHNICAL FIELD

Embodiments of the subject matter described herein relate generally to vehicle drive systems, and more particularly, embodiments of the subject matter relate to hybrid vehicles having a double-ended inverter drive system.

BACKGROUND

In recent years, advances in technology, as well as ever evolving tastes in style, have led to substantial changes in the design of automobiles. One of the changes involves the power usage and complexity of the various electrical systems within automobiles, particularly alternative fuel vehicles, such as hybrid, electric, and fuel cell vehicles.

Many of the electrical components, including the electric motors used in such vehicles, receive electrical power from alternating current (AC) power supplies. However, the power sources (e.g., batteries) used in such applications provide only direct current (DC) power. Thus, devices known as "power inverters" are used to convert the DC power to AC power, which often utilize several of switches, or transistors, operated at various intervals to convert the DC power to AC power.

Additionally, such vehicles, particularly fuel cell vehicles, often use two separate voltage sources (e.g., a battery and a fuel cell) to power the electric motors that drive the wheels. "Power converters," such as direct current-to-direct current (DC/DC) converters, are typically used to manage and transfer the power from the two voltage sources. Modem DC/DC converters often include transistors electrically interconnected by an inductor. By controlling the states of the various transistors, a desired average current can be impressed through the inductor and thus control the power flow between the two voltage sources.

The utilization of both a power inverter and a power converter greatly increases the complexity of the electrical system of the automobile. The additional components required for both types of devices also increase the overall cost and weight of the vehicle. Accordingly, systems and methods have been developed for operating a motor coupled to multiple power sources without a DC/DC converter while maximizing the performance of the motor by utilizing dual inverter electrical systems.

A significant source of power loss in a power inverter is the loss associated with modulating the switches or transistors (i.e., switching loss). Discontinuous pulse width modulation (DPWM) techniques have been developed in efforts to reduce switching loss in traditional single-inverter systems.

Accordingly, it is desirable to provide methods and systems for using discontinuous pulse width modulation (DPWM) in a double-ended inverter system to reduce switching loss without compromising the benefits of a double-ended inverter system. Other desirable features and characteristics of the present invention will become apparent from the subsequent detailed description and the appended claims, taken in conjunction with the accompanying drawings and the foregoing technical field and background

BRIEF SUMMARY

A method is provided for controlling a double-ended inverter system having a first inverter and a second inverter, the second inverter having a first leg associated with a first phase current, a second leg associated with a second phase current, and a third leg associated with a third phase current. When the first phase current is greater than the second phase current and the third phase current and if the first phase current is greater than a desired second inverter current, the method comprises modulating the first leg at a first duty cycle and clamping the second leg and the third leg to a negative voltage rail of the second inverter. If the first phase current is less than the desired second inverter current, the method comprises clamping the first leg to a positive voltage rail of the second inverter and if the second phase current is greater than zero, clamping the third leg to the negative voltage rail and modulating the second leg at a second duty cycle.

A method is provided for controlling a double-ended inverter system having a first inverter and a second inverter, the second inverter having a first leg associated with a first phase current ($i_{a2}$), a second leg associated with a second phase current ($i_{b2}$), and a third leg associated with a third phase current ($i_{c2}$). The method comprises determining a desired second inverter current ($i_{dc2}$). If $i_{a2} \geq i_{b2}$ and $i_{a2} > i_{c2}$ and $i_{a2} \geq i_{dc2}$, the method further comprises modulating the first leg at a first duty cycle and clamping the second leg and the third leg to a negative voltage rail of the second inverter. If $i_{b2} > i_{a2}$ and $i_{b2} \geq i_{c2}$ and $i_{b2} \geq i_{dc2}$, the method further comprises modulating the second leg at a second duty cycle and clamping the first leg and the third leg to the negative voltage rail. If $i_{c2} \geq i_{a2}$ and $i_{c2} > i_{b2}$ and $i_{c2} \geq i_{dc2}$, the method further comprises modulating the third leg at a third duty cycle and clamping the first leg and the second leg to the negative voltage rail.

A method is provided for controlling a double-ended inverter system having a first inverter and a second inverter. The method comprises determining a required output current and determining a desired second inverter current. The method further comprises determining a second inverter switching function, wherein only a selected leg in the second inverter is modulated at a duty cycle, determining a first inverter switching function based on the second inverter switching function, and modulating the first inverter and the second inverter using the first inverter switching function and the second inverter switching function.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIGS. 5-10 are graphs of various operating characteristics of a double-ended inverter system in accordance with one embodiment;

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics shown herein depict exemplary arrangements of elements, additional intervening elements, devices, features, or components may be present in an embodiment of the depicted subject matter. The terms "first", "second" and other such numerical terms referring to structures do not imply a sequence or order unless clearly indicated by the context.

Figure 1:
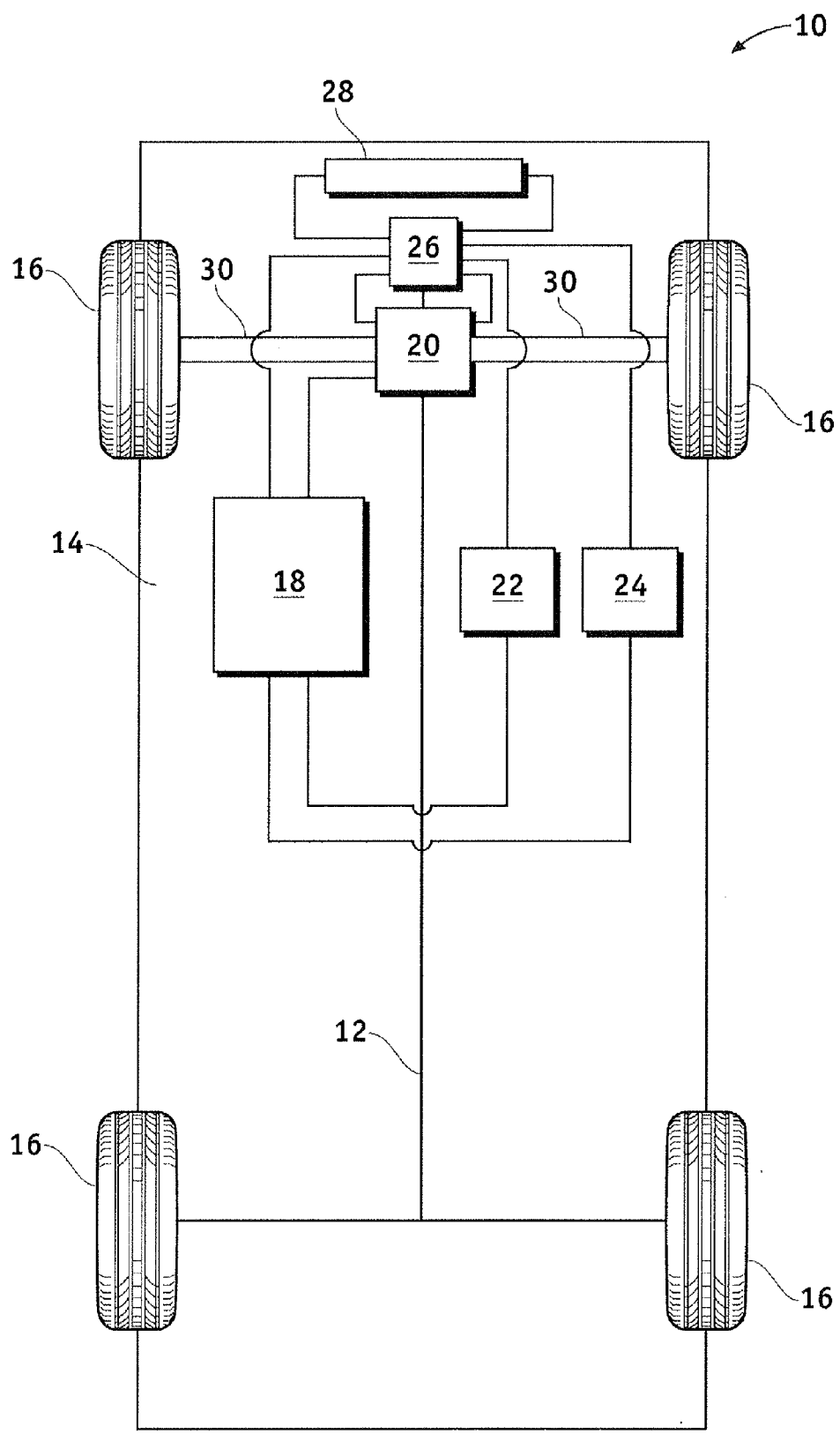
FIG. 1 is a schematic view of an exemplary automobile in accordance with one embodiment.

FIG. 1 illustrates a vehicle, or automobile 10, according to one embodiment of the present invention. The automobile 10 includes a chassis 12, a body 14, four wheels 16, and an electronic control system 18. The body 14 is arranged on the chassis 12 and substantially encloses the other components of the automobile 10. The body 14 and the chassis 12 may jointly form a frame. The wheels 16 are each rotationally coupled to the chassis 12 near a respective corner of the body 14.

The automobile 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The automobile 10 may also incorporate any one of, or combination of, a number of different types of engines, such as, for example, a gasoline or diesel fueled combustion engine, a "flex fuel vehicle" (FFV) engine (i.e., using a mixture of gasoline and alcohol), a gaseous compound (e.g., hydrogen and natural gas) fueled engine, a combustion/electric motor hybrid engine, and an electric motor.

In the exemplary embodiment illustrated in FIG. 1, the automobile 10 further includes a motor 20 (i.e., an electric motor/generator, traction motor, etc.), a first energy source 22, a second energy source 24, a power inverter assembly 26, and a radiator 28. The radiator 28 is connected to the frame at an outer portion thereof and although not illustrated in detail, includes multiple cooling channels that contain a cooling fluid (i.e., coolant), such as water and/or ethylene glycol (i.e., "antifreeze), and is coupled to the power inverter assembly 26 and the motor 20. In one embodiment, the power inverter assembly 26 receives and shares coolant with the motor 20. As shown in FIG. 1, the motor 20 may also include a transmission integrated therein such that the motor 20 and the transmission are mechanically coupled to at least some of the wheels 16 through one or more drive shafts 30.

As shown, the first energy source 22 and the second energy source 24 are in operable communication and/or electrically coupled to the electronic control system 18 and the power inverter assembly 26. Although not illustrated, the first energy source 22 and the second energy source 24 may vary depending on the embodiment and may be of the same or different type. In one or more embodiments, the first energy source 22 and second energy source 24 may each comprise a battery, a fuel cell, an ultra capacitor, or another suitable voltage source. A battery may be any type of battery suitable for use in a desired application, such as a lead acid battery, a lithium-ion battery, a nickel-metal battery, or another rechargeable battery. An ultra capacitor may comprise a super capacitor, an electrochemical double layer capacitor, or any other electrochemical capacitor with high energy density suitable for a desired application.

Figure 2:
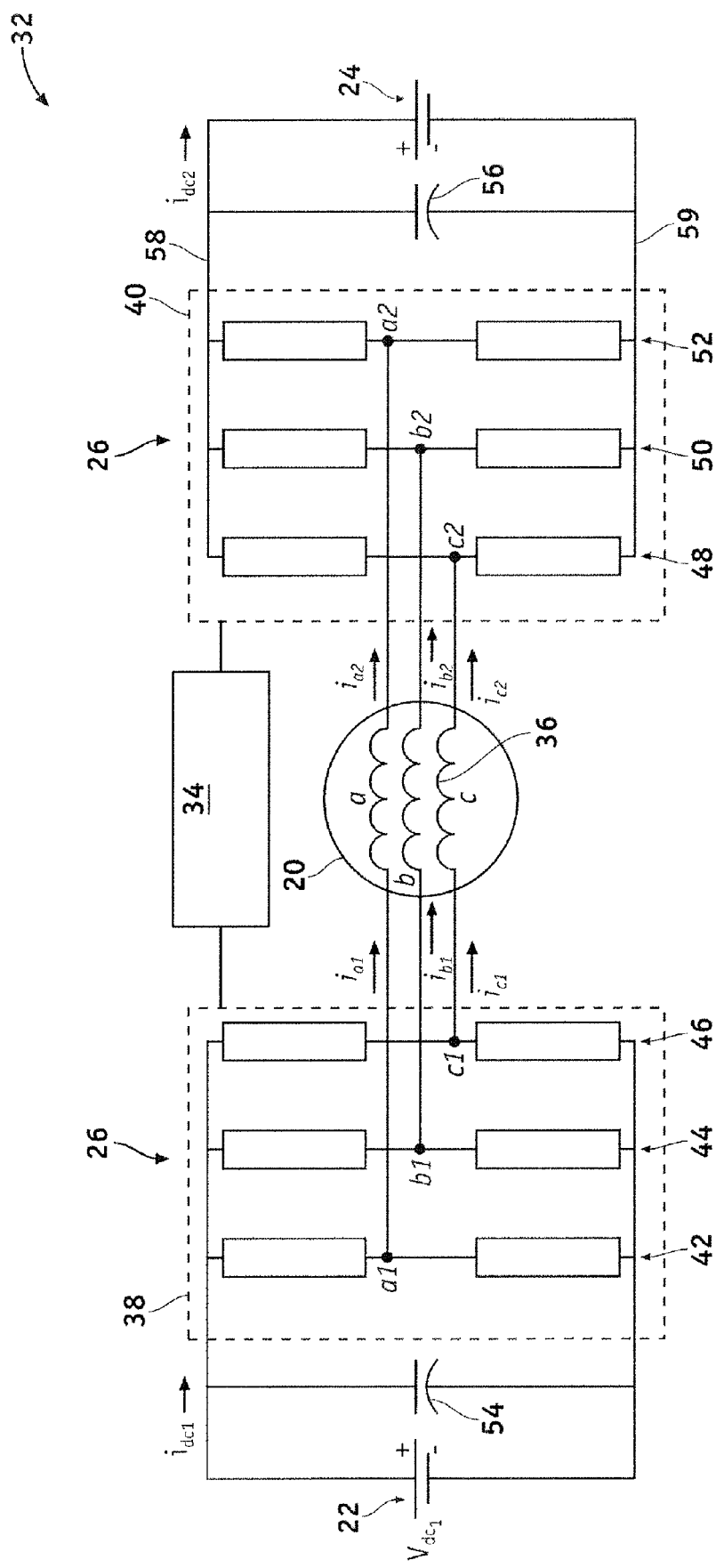
FIG. 2 is a schematic view of a double-ended inverter system in accordance with one embodiment.

Referring now to FIGS. 1 and 2, a double-ended inverter system 32 may be adapted to drive the motor 20 in accordance with one embodiment. The double-ended inverter system 32 includes the motor 20, the first energy source 22, the second energy source 24, the power inverter assembly 26, and a controller 34.

The motor 20 is a multi-phase alternating current (AC) motor and includes a set of windings 36 (or coils), wherein each winding corresponds to one phase of the motor 20. In an exemplary embodiment, the motor 20 is a three-phase motor. However, some of the principles discussed herein may apply to a motor 20 with any number of phases, and may be modified accordingly as will be appreciated in the art. Although not illustrated, the motor 20 includes a stator assembly (including the coils), a rotor assembly (including a ferromagnetic core), and a cooling fluid (i.e., coolant), as will be appreciated by one skilled in the art. The motor 20 may be an induction motor, a permanent magnet motor, or any type suitable for the desired application.

Referring again to FIG. 2, the power inverter assembly 26 includes a first inverter 38 and a second inverter 40, each including six switches (e.g., semiconductor devices, such as transistors and/or switches) with antiparallel diodes (i.e., antiparallel to each switch). As shown, the switches in the inverters 38, 40 are arranged into three legs (or pairs), with legs 42, 44, and 46 being in the first inverter 38 and legs 48, 50, and 52 being in the second inverter 40.

A first of the windings 36 (i.e., phase a) of the motor 20 is electrically connected, at opposing ends thereof, between the switches of leg 42 in the first inverter 38 and leg 52 in the second inverter 40. A second of the windings 36 (i.e., phase b) is connected between the switches of leg 44 in the first inverter 38 and leg 50 of the second inverter 40. A third of the windings 36 (i.e., phase c) is connected between the switches of legs 46 and 48 as shown. In this configuration, the phase currents throughout the double-ended inverter system 32 are the same (i.e., for phase a current $i_a = i_{a1} = i_{a2}$, etc.).

Still referring to FIG. 2, the double-ended inverter system 32 may also include first and second capacitors 54 and 56 respectively connected in parallel with the first and second energy sources 22, 24 to smooth current ripple during operation. A positive voltage rail 58 of the second inverter 40 is associated with a positive voltage reference of the second energy source 24, and a negative voltage rail 59 of the second inverter 40 is associated with a negative voltage reference of the second energy source 24. The controller 34 is in operable communication and/or electrically coupled to the first and second inverters 38, 40. The controller 34 is responsive to commands received from the driver of the automobile 10 (i.e., via an accelerator pedal) and provides commands to the first inverter 38 and the second inverter 40, as will be described, to control the output of the inverters 38, 40.

Referring again to FIG. 1, the electronic control system 18 is in operable communication with the motor 20, the first energy source 22, the second energy source 24, and the power inverter assembly 26. Although not shown in detail, the electronic control system 18 may include various sensors and automotive control modules, or electronic control units (ECUs), such as an inverter control module (i.e., the controller 34 shown in FIG. 2) and a vehicle controller, and at least one processor and/or a memory which includes instructions stored thereon (or in another computer-readable medium) for carrying out the processes and methods as described below.

During operation, the automobile 10 is operated by providing power to the wheels 16 with the motor 20 which receives power from the first energy source 22 and the second energy source 24 in an alternating manner and/or with the first energy source 22 and the second energy source 24 simultaneously. In order to power the motor 20, DC power is provided from the first energy source 22 and the second energy source 24 to the first and second inverters 38, 40 respectively, which convert the DC power into AC power, as is commonly understood in the art. The first and second inverters 38, 40 produce AC voltages across the windings 36 (or phases). As is commonly understood, the required voltages across the windings 36 of the motor 20 are dependent on the speed, commanded torque (i.e., commanded synchronous frame currents), and other motor parameters.

Figure 3:
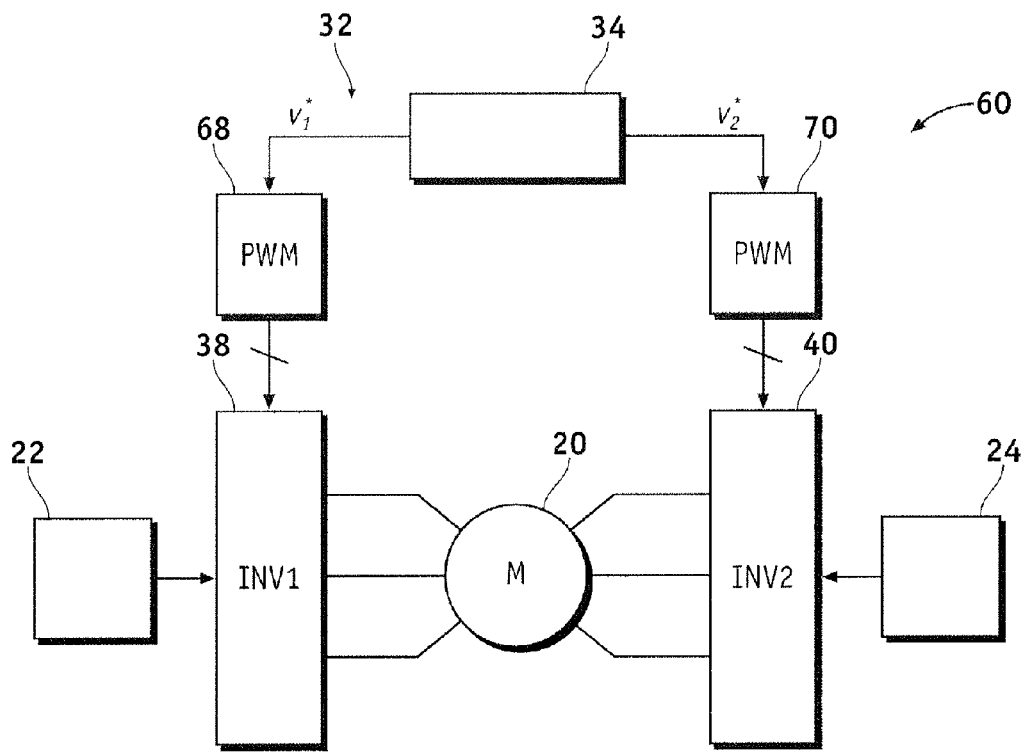
FIG. 3 is a schematic view of a control system for operating the double-ended inverter system of FIG. 2 in accordance with one embodiment.

FIG. 3 illustrates a control system 60 for operating a motor 20 in a double-ended inverter system 32 utilizing the principles described herein in accordance with one embodiment. High frequency pulse width modulation (PWM) may be employed by the controller 34 to modulate and control the inverters 38, 40 and manage the voltage produced by the inverters 38, 40. The control system 60 includes first and second PWM blocks 68 and 70, and the double-ended inverter system 32.

The controller 34 provides a control algorithm that achieves desired power flow between the first and second energy sources 22, 24 while producing the commanded torque inside the motor 20. Although not shown, the control system 60 receives a torque command for the motor 20 from which the controller 34 may determine power commands for the first energy source 22 (and/or the first inverter 38) and the second energy source 24 (and/or the second inverter 40), as well as synchronous frame currents for the windings 36 within the motor 20 (i.e., a required or desired motor current).

Many combinations of voltage across the windings 36 may produce the commanded torque in the motor 20 and achieve desired power flow to (or from) the energy sources 22, 24 and the motor 20. If the motor 20 does not require the maximum power output of one energy source 22 or 24, the extra power from the energy source 22 or 24 may be used to charge the other energy source 22 or 24. For illustrative purposes and the sake of brevity, it may be discussed as though the first energy source 22 produces excess power to charge the second energy source 24, however, it will be appreciated by those skilled in the art that numerous alternative desired power flows are possible and this distinction is not limiting but made merely for reference purposes. An optimal operating point determines the modulating voltage across the terminals of the inverters 38, 40. It will be appreciated by those skilled in the art that conditions for determining an optimal operating point are left to the designer and will vary depending upon the application for which the motor 20 is being used, along with the types of energy sources 22, 24 selected.

The controller 34 provides the first and second PWM blocks 68 and 70 with modulating voltage signals $v_1^*$ and $v_2^*$ to generate PWM signals to operate the switches within the first and second inverters 38, 40 to cause the desired output voltages to be applied across the windings 36 within the motor 20 to operate the motor 20 with the required torque. It will be appreciated by those skilled in the art that the control system 60 can be further modified to incorporate appropriate feedback signals and other methods known in the art to control the inverters 38, 40, which are beyond the scope of this disclosure.

Figure 4:
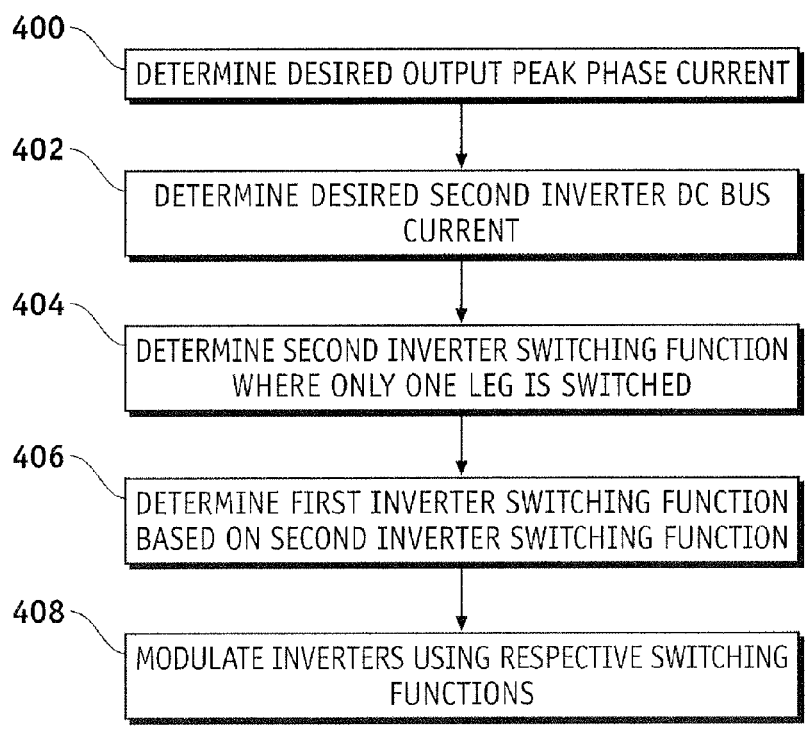
FIG. 4 is a flow chart that graphically illustrates an embodiment of a discontinuous pulse width modulation process.

FIG. 4 is a flow chart of an embodiment of a discontinuous pulse width modulation process. The various tasks performed in connection with this process may be performed by software, hardware, firmware, or any combination thereof. For illustrative purposes, the following description of this process may refer to elements mentioned above in connection with FIGS. 1-3. In practice, portions of the process may be performed by different elements of the described system. It should be appreciated that the process may include any number of additional or alternative tasks, the tasks shown in FIG. 4 need not be performed in the illustrated order, and the process may be incorporated into a more comprehensive procedure or process having additional functionality not described in detail herein.

Referring to FIG. 4, the controller may determine the desired (or required) output phase currents in order to produce a commanded torque in a motor (task 400). The controller may also determine a desired second inverter current in the second inverter bus in order to produce the desired power flow to/from the second energy source (task 402). In accordance with one embodiment, the controller may determine a switching function for the second inverter in order to produce the desired second inverter current in the second inverter bus (task 404). In an exemplary embodiment, the switching function is determined so only one leg in the second inverter is selected for modulating at a duty cycle, while the other two legs of the second inverter are clamped to either the positive voltage rail or the negative voltage rail (i.e., the other two legs are not modulated/switched). Clamping a leg to the positive voltage rail may be understood as turning on or switching on (i.e., by applying 'ON' state gate voltage to the electronic switch) the top switch of a switch pair such that current flows through the top switch and to/from the positive voltage rail while the other switch in the pair remains off. For example, referring to FIG. 2, the top switch in leg 52 may be switched on, such that current flows through the switch and the voltage level at point a2 is roughly equivalent to the voltage level of the positive voltage rail 58, the difference being the voltage drop across the switch (transistor—IGBT or diode based on the current flow direction). This may be represented by $d_n=1$ or a duty cycle or switching function of 1. Conversely, clamping a leg to the negative voltage rail may be understood as switching on the bottom switch so current flows through the bottom switch and to/from the negative voltage rail. This may be represented by $d_n=0$ or a duty cycle or switching function of 0.

A clamped phase leg will not produce switching loss while clamped to a rail, thereby reducing the overall switching loss in the second inverter. In an exemplary embodiment, two of the three legs are clamped at any one time, meaning only one leg produces switching loss. Based on the second inverter switching function and the desired motor current, a first inverter switching function may be determined (task 406). In an exemplary embodiment, the first inverter switching function essentially adjusts harmonic voltage components so the voltage across the motor remains sinusoidal and/or balanced as will be appreciated in the art. The controller may determine the first inverter switching function and may provide signals to modulate the first inverter accordingly (task 408).

In an exemplary embodiment, during operation, the controller 34 may be provided with a torque command (i.e., by the electronic control system 18) and determine the peak phase current ($I_p$) required to produce the commanded torque (i.e., required output current). The controller may also determine a desired power flow to/from the second energy source, and from this, determine a desired second inverter current ($i_{dc2}$) to charge/discharge the second energy source 24. The maximum second inverter current ($i_{dc2}$) that can be realized by linear modulation is $$\frac{\sqrt{3}\, I_p}{2},$$

as will be appreciated in the art.

In an exemplary embodiment, when the magnitude of the second inverter 40 current ($i_{dc2}$) is less than one half of the peak AC phase current $I_p$ $$\left(\text{i.e., } 0 \le |i_{dc2}| \le \frac{I_p}{2}\right),$$

only one leg 48, 50, 52 in the second inverter 40 is switching while the other two legs are clamped to the negative voltage rail 59. A single phase current is capable of providing the second inverter current ($i_{dc2}$) when it is less than half the peak AC current. When two phase currents are equal, the respective leg 48, 50, 52 may be selected as desired, and the manner of resolving this situation is a matter of design preference as will be understood in the art. In accordance with one embodiment, the algorithm used to determine the switching function of the second inverter 40 when $$0 \le |i_{dc2}| \le \frac{I_p}{2}$$

may be characterized by:

If $(i_{a2} \ge i_{b2})$ & $(i_{a2} > i_{c2})$:

$$d_{b2} = 0,\ d_{c2} = 0 \text{ and } d_{a2} = \frac{i_{dc2}}{i_{a2}}$$

If $(i_{b2} \ge i_{c2})$ & $(i_{b2} > i_{a2})$:

$$d_{c2} = 0,\ d_{a2} = 0 \text{ and } d_{b2} = \frac{i_{dc2}}{i_{b2}}$$

If $(i_{c2} \ge i_{a2})$ & $(i_{c2} > i_{b2})$ $$d_{a2} = 0,\ d_{b2} = 0 \text{ and } d_{c2} = \frac{i_{dc2}}{i_{c2}}.$$

As shown in FIG. 5, in an exemplary embodiment, the desired motor phase a current ($i_a$) is greater than the other phase currents ($i_b$, $i_c$) for one-third of a cycle (i.e., 120° or $2\pi/3$ radians due to a balanced three-phase system). FIG. 6 shows the switching function of the second inverter 40 in this exemplary case using the process described above. For example, the leg 52 in the second inverter 40 corresponding to phase a may be switched at a duty cycle determined by dividing the desired second inverter current ($i_{dc2}$) by the inverter phase current $$(i_{a2})\left(d_{a2} = \frac{i_{dc2}}{i_{a2}}\right),$$

and the other two legs 48 and 50 are clamped to the negative voltage rail 59 ($d_{b2}=0, d_{c2}=0$). FIGS. 5-6 illustrate operation throughout an entire cycle (i.e., 360° or $2\pi$ radians). The desired second inverter current ($i_{dc2}$) flowing to the second energy source 24 is shown in FIG. 7.

Figure 8:
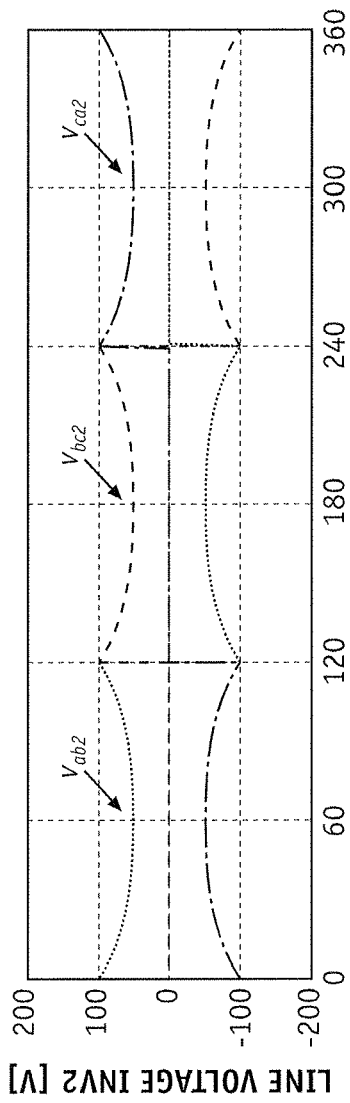
Figure 9:
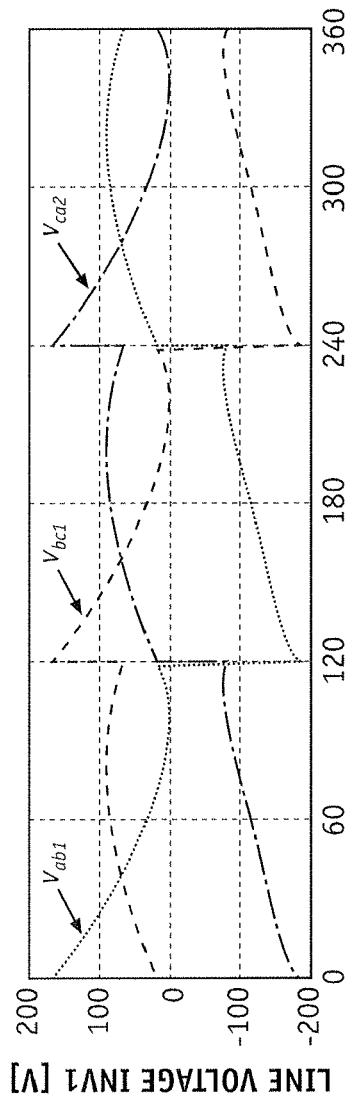
Figure 10:
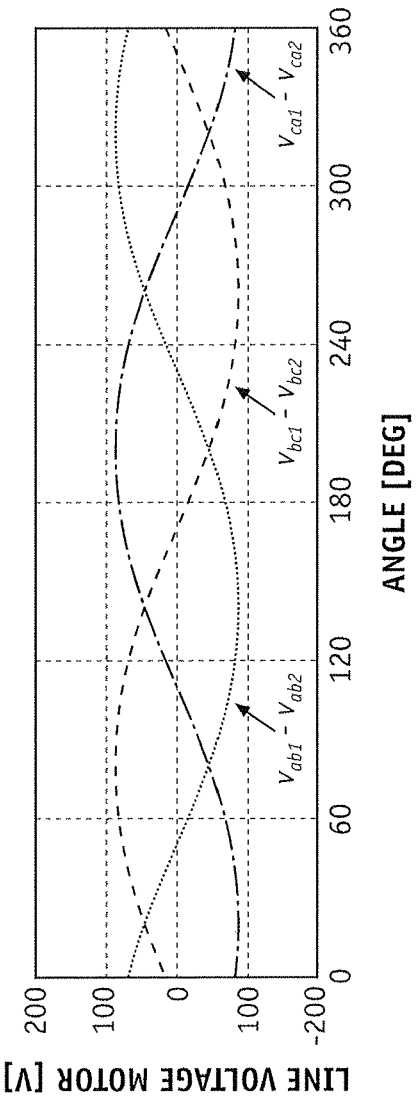

FIGS. 8-10 illustrate the voltage levels in the double-ended inverter system 32. In an exemplary embodiment, after the controller 34 determines the peak phase current $I_p$ and the duty cycle/switching function for the second inverter 40, the controller 34 may determine a switching function for the first inverter 38. As shown in FIG. 9, the switching function and voltages of the first inverter 38 are not sinusoidal in an exemplary embodiment. DPWM techniques may be used to modulate the first inverter 38 to produce the desired voltage levels and reduce switching loss in the first inverter 38. As shown in FIG. 10, the resulting line voltages at the motor 20 are sinusoidal and free from any harmonics or distortion.

In an exemplary embodiment, when the magnitude of the desired second inverter current ($i_{dc2}$) is greater than one half of the peak phase current $$I_p\left(\text{i.e., } \frac{I_p}{2} < |i_{dc2}|\right),$$

a selected phase current cannot supply the desired second inverter current ($i_{dc2}$) throughout an entire duration of a cycle. When a phase current (i.e., $i_{a2}$) cannot supply the desired second inverter current ($i_{dc2}$), another leg 48, 50, 52 of the second inverter 40 associated with another phase current must be switched to achieve the desired DC current to/from the second energy source 24. In accordance with one embodiment, the selected leg 48, 50, 52 is clamped to the positive voltage rail 58 during this interval. One of the other legs 48, 50, 52 is modulated at a duty cycle that compensates for the additional current required to maintain a constant second inverter current ($i_{dc2}$) level.

In accordance with one embodiment, the algorithm used to determine the switching function of the second inverter 40 when $$\frac{I_p}{2} < |i_{dc2}|$$

may be characterized by:

If $(i_{a2} \geq i_{b2}) \, \& \, (i_{a2} > i_{c2})$:

If $i_{a2} \geq i_{dc2}$ $$d_{b2} = 0, d_{c2} = 0 \text{ and } d_{a2} = \frac{i_{dc2}}{i_{a2}}$$

Else if $i_{c2} > 0$ $$d_{a2} = 1, d_{b2} = 0 \text{ and } d_{c2} = \frac{i_{dc2} - i_{a2}}{i_{c2}}$$

Else $$d_{a2} = 1, d_{c2} = 0 \text{ and } d_{b2} = \frac{i_{dc2} - i_{a2}}{i_{b2}}$$

If $(i_{b2} \geq i_{c2}) \, \& \, (i_{b2} > i_{a2})$;

If $i_{b2} \geq i_{dc2}$ $$d_{a2} = 0, d_{c2} = 0 \text{ and } d_{b2} = \frac{i_{dc2}}{i_{b2}}$$

Else if $i_{a2} > 0$ $$d_{b2} = 1, d_{c2} = 0 \text{ and } d_{a2} = \frac{i_{dc2} - i_{b2}}{i_{a2}}$$

Else $$d_{b2} = 1, d_{a2} = 0 \text{ and } d_{c2} = \frac{i_{dc2} - i_{b2}}{i_{c2}}$$

If $(i_{c2} \geq i_{a2}) \, \& \, (i_{c2} > i_{b2})$:

If $i_{c2} \geq i_{dc2}$ $$d_{a2} = 0, d_{b2} = 0 \text{ and } d_{c2} = \frac{i_{dc2}}{i_{c2}}$$

Else if $i_{b2} > 0$ $$d_{c2} = 1, d_{a2} = 0 \text{ and } d_{b2} = \frac{i_{dc2} - i_{c2}}{i_{b2}}$$

Else $$d_{c2} = 1, d_{b2} = 0 \text{ and } d_{a2} = \frac{i_{dc2} - i_{c2}}{i_{a2}}.$$

Figure 11:
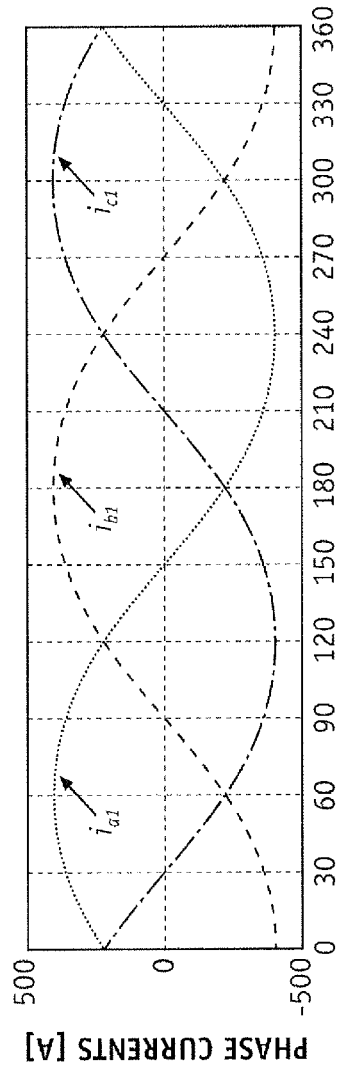
FIGS. 11-16 are graphs of various operating characteristics of a double-ended inverter system in accordance with one embodiment.
Figure 12:
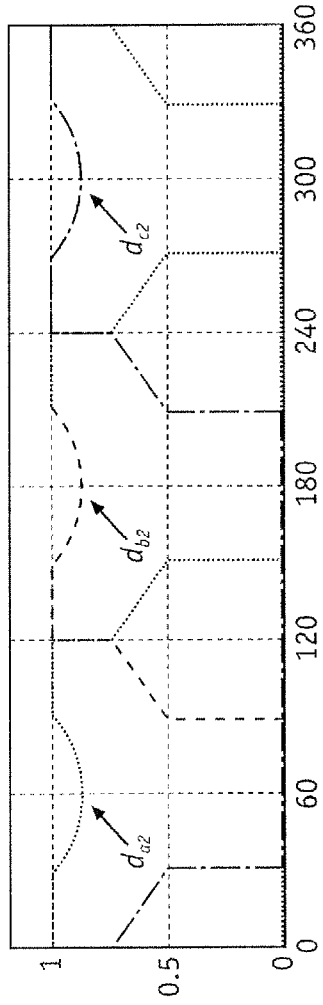
Figure 13:
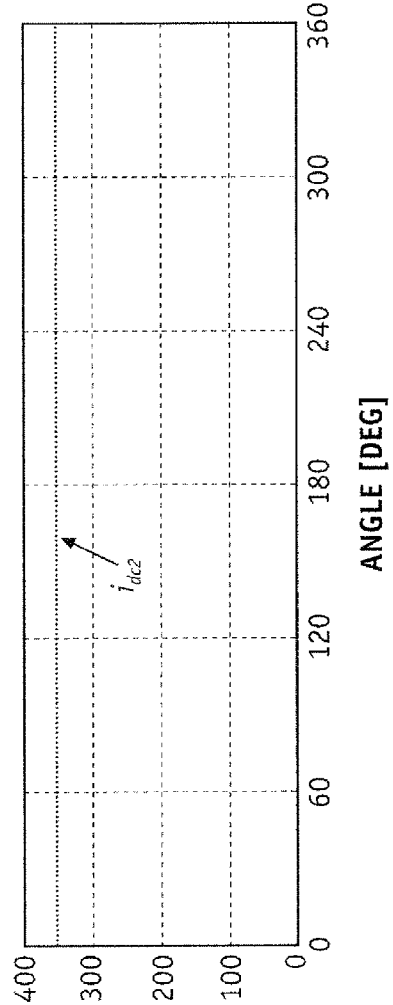

As shown in FIGS. 11-13, in an exemplary embodiment, the phase a current ($i_a$) cannot supply the desired second inverter current ($i_{dc2}$) throughout the entire duration of the interval where the phase a current is greater than the other two phases (i.e., 120° or 2π/3 radians as shown). In FIG. 11, the phase a current ($i_a$) exceeds the desired second inverter current ($i_{dc2}$) for a portion of the interval (from 30° to 90°). During this interval, the phase a current ($i_a$) can supply the desired second inverter 40 current ($i_{dc2}$). Therefore, for example, the leg 52 in the second inverter 40 associated with phase a is switched at a duty cycle determined by dividing the desired second inverter current by the phase a current $$\left( d_{a2} = \frac{i_{dc2}}{i_{a2}} \right)$$

while the other two legs 48 and 50 are clamped to the negative voltage rail 59 ($d_{b2}=0, d_{c2}=0$).

When the phase a current ($i_a$) cannot supply the desired second inverter current ($i_{dc2}$), another leg 48, 50 of the second inverter 40 must be switched in order to maintain the desired DC current level to/from the second energy source 24. In an exemplary embodiment, the phase a leg 52 is clamped to the positive voltage rail 58 during this interval. The other legs 48, 50 are modulated at a duty cycle that compensates for the additional current required to maintain a constant level. In the exemplary embodiment, if the phase c current ($i_c$) is greater than zero (from 0° to 30° as shown), the leg 50 associated with phase b is clamped to the negative voltage rail 59 while the leg 48 associated with phase c is modulated at a duty cycle ($d_{c2}$) determined by $$d_{c2} = \frac{i_{dc2} - i_{a2}}{i_{c2}}.$$

When the phase b current ($i_b$) is greater than zero (from 90° to 120° as shown), the leg 48 associated with phase c is clamped to the negative voltage rail 59 while the leg 50 associated with phase b is modulated at a duty cycle ($d_{b2}$) determined by $$d_{b2} = \frac{i_{dc2} - i_{a2}}{i_{b2}}.$$

FIG. 12 illustrates the resulting second inverter switching function and FIG. 13 illustrates the second inverter current ($i_{dc2}$).

Figure 14:
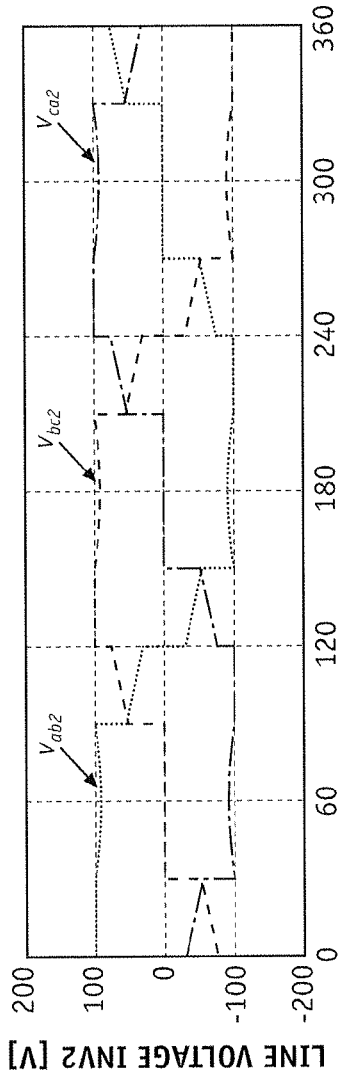
Figure 15:
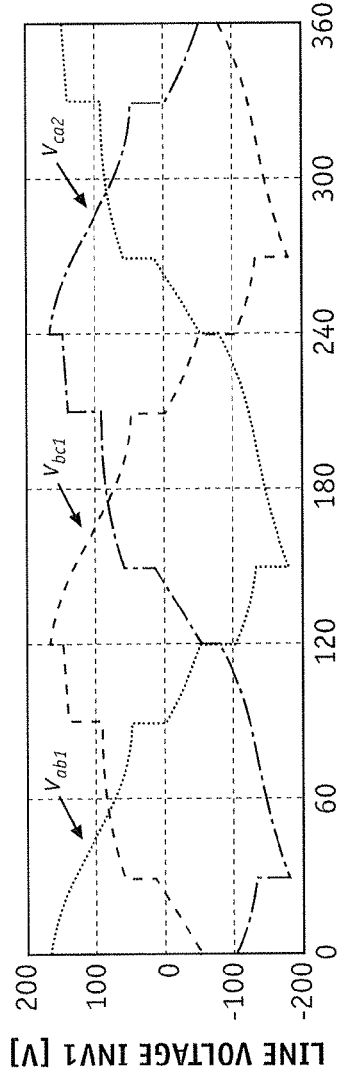
Figure 16:
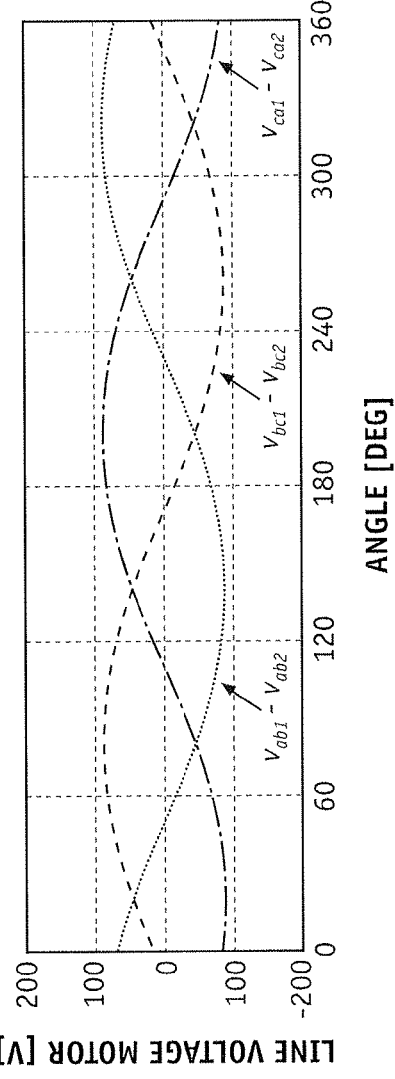

FIGS. 14-16 show the voltage levels in the double-ended inverter system 32 in an exemplary embodiment. As discussed above, the controller 34 may determine the peak phase current $I_p$ and the duty cycle/switching function for the second inverter 40, based upon which the controller 34 may determine a switching function for the first inverter 38. Again, as shown in FIG. 15, the switching function and voltages of the first inverter 38 are not sinusoidal in an exemplary embodiment. DPWM techniques may be used to modulate the first inverter 38 to produce the desired motor current and reduce switching loss in the first inverter 38. As shown in FIG. 16, the resulting line voltages at the motor 20 are sinusoidal and free from any harmonics or distortion.

Figure 19:
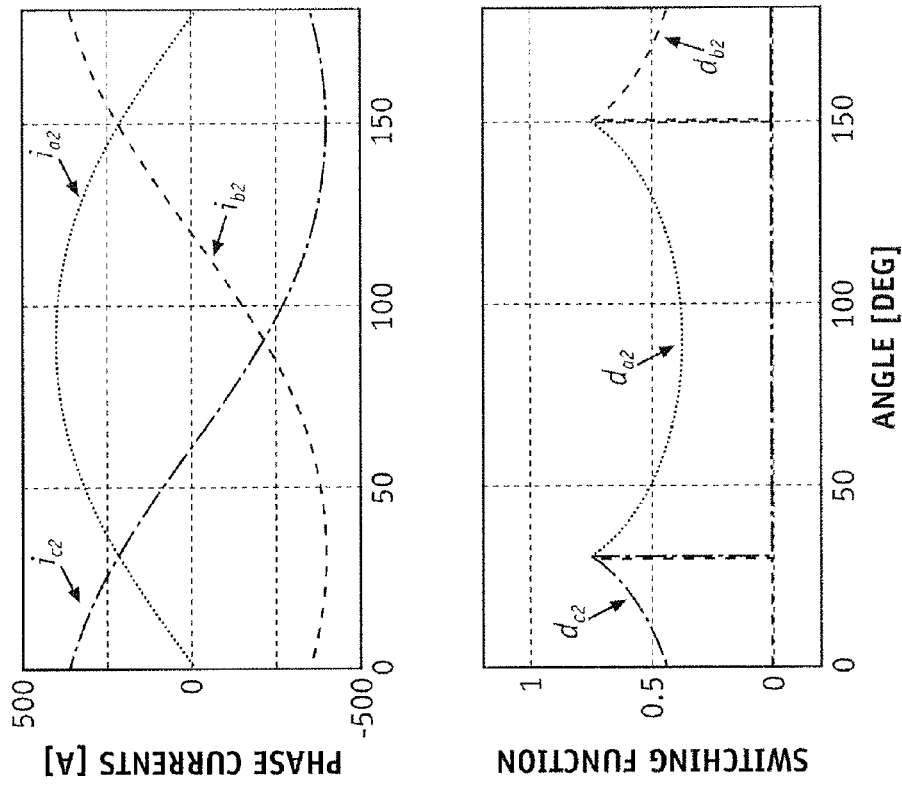
FIGS. 17-20 are graphs of operating characteristics of a double-ended inverter system and associated power loss in accordance with one embodiment compared to another modulation scheme.
Figure 17:
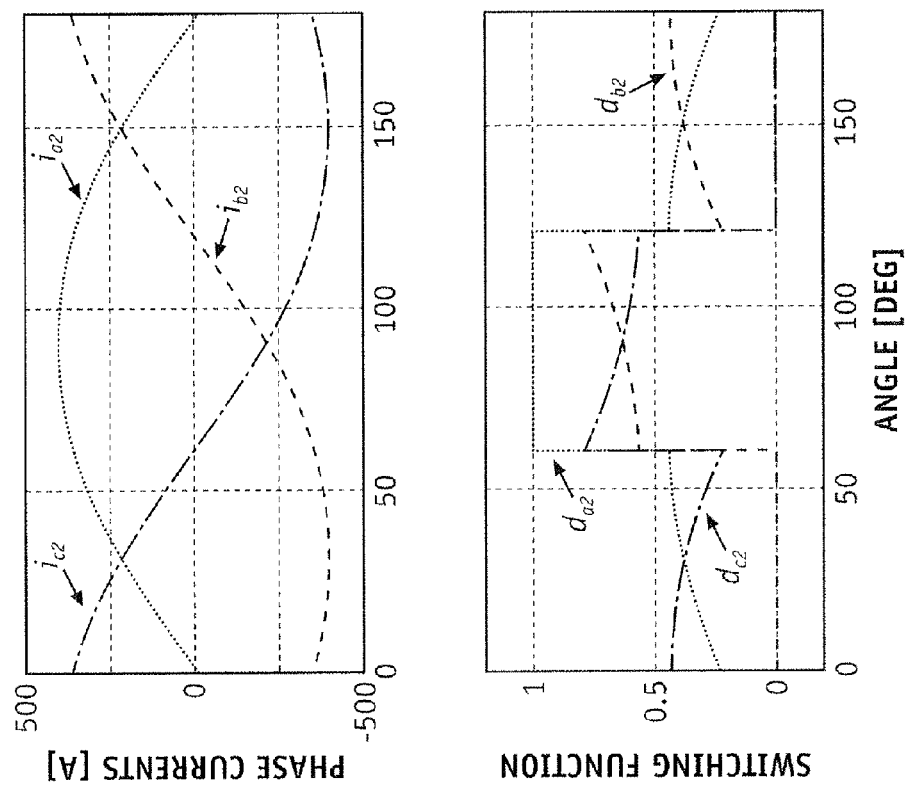
Figure 18:
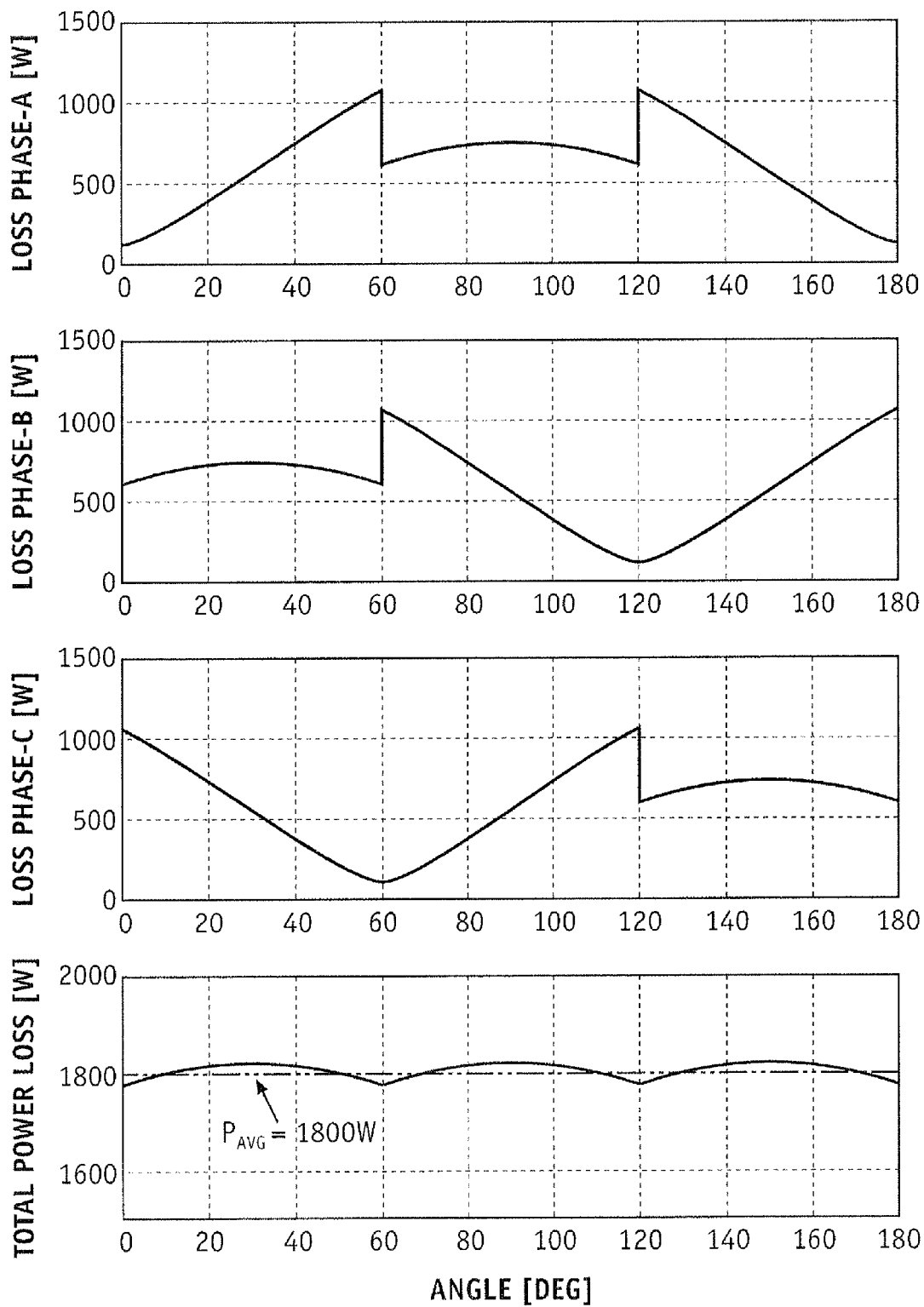
Figure 20:
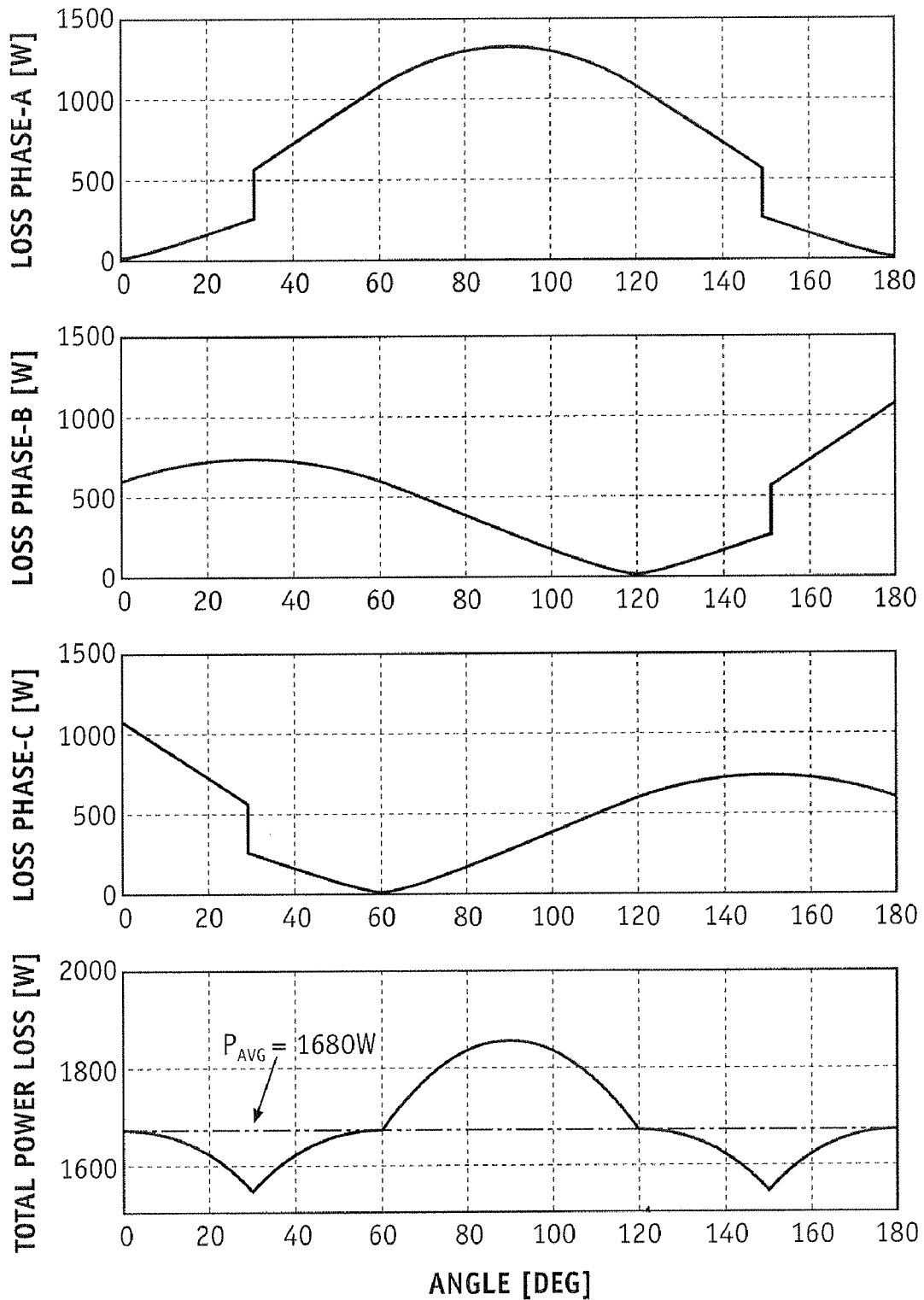

FIG. 17 illustrates operating characteristics of a conventional DPWM technique and FIG. 18 illustrates the switching power loss associated with the switching function of FIG. 17 for an exemplary case. FIG. 19 illustrates operating characteristics of the DPWM technique discussed herein and FIG. 20 illustrates the switching power loss associated with the switching function of FIG. 19 for an exemplary case. For the exemplary case shown, the average power loss is reduced from 1800 W to 1680 W when the methods discussed herein are applied.

The system and/or method described above provides an electrical system to power the motor 20 with two separate energy sources 22, 24 while reducing the switching loss when compared to conventional DPWM techniques. Other features of a double-ended inverter system 32, such as various power flows or power transfer, may also be achieved. As described above, the performance of the motor 20 is not impaired and the commanded torque may still be generated within the motor 20, while allowing excess power to flow between the energy sources 22, 24.

Other embodiments may utilize the system and method described above in different types of automobiles, different vehicles (e.g., watercraft and aircraft), or in different electrical systems altogether, as it may be implemented in any situation where the voltages of the two sources dynamically change over a wide range. The motor 20 and the inverters 38, 40 may have different numbers of phases, and the systems described herein should not be construed as limited to a three-phase design. The basic principles discussed herein may be extended to higher-order phase systems as will be understood in the art. Other forms of energy sources 22, 24 may be used, such as current sources and loads including diode rectifiers, thyristor converters, fuel cells, inductors, capacitors, and/or any combination thereof.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for controlling a double-ended inverter system having a first inverter and a second inverter, the second inverter having a first leg associated with a first phase current, a second leg associated with a second phase current, and a third leg associated with a third phase current, when the first phase current is greater than the second phase current and the third phase current, the method comprising:
if the first phase current is greater than a desired second inverter current:
modulating the first leg at a first duty cycle; and
clamping the second leg and the third leg to a negative voltage rail of the second inverter; and
if the first phase current is less than the desired second inverter current:
clamping the first leg to a positive voltage rail of the second inverter; and
if the second phase current is greater than zero:
clamping the third leg to the negative voltage rail; and
modulating the second leg at a second duty cycle.

2. The method of claim 1, further comprising determining the first duty cycle by dividing the desired second inverter current by the first phase current.

3. The method of claim 1, further comprising determining the second duty cycle by dividing a difference between the desired second inverter current and the first phase current by the second phase current.

4. The method of claim 1, wherein determining the first duty cycle is governed by the relationship $$d_{a2} = \frac{i_{dc2}}{i_{a2}},$$

where $i_{a2}$ is the first phase current, $i_{dc2}$ is the desired second inverter current, and $d_{a2}$ is the first duty cycle.

5. The method of claim 1, wherein determining the second duty cycle is governed by the relationship $$d_{b2} = \frac{i_{dc2} - i_{a2}}{i_{b2}},$$

where $i_{b2}$ is the second phase current and $d_{b2}$ is the second duty cycle.

6. The method of claim 1, further comprising:
if the first phase current is less than the desired second inverter current and if the third phase current is greater than zero:
clamping the second leg to the negative voltage rail;
determining a third duty cycle by dividing a difference between the desired second inverter current and the first phase current by the third phase current; and
modulating the third leg at the third duty cycle.

7. The method of claim 6, wherein determining the third duty cycle is governed by the relationship $$d_{c2} = \frac{i_{dc2} - i_{a2}}{i_{c2}},$$

where $i_{c2}$ is the third phase current and $d_{c2}$ is the third duty cycle.

8. The method of claim 1, further comprising:
determining a first inverter switching function; and
modulating the first inverter according to the first inverter switching function.

9. The method of claim 8, wherein determining the first inverter switching function is based on a desired motor current and a second inverter switching function, such that voltage across a motor coupled to the first inverter and the second inverter is sinusoidal.

10. A method for controlling a double-ended inverter system having a first inverter and a second inverter, the second inverter having a first leg associated with a first phase current ($i_{a2}$), a second leg associated with a second phase current ($i_{b2}$), and a third leg associated with a third phase current ($i_{c2}$), the method comprising:
determining a desired second inverter current ($i_{dc2}$); and
if $i_{a2} \geq i_{b2}$ and $i_{a2} > i_{c2}$ and $i_{a2} \geq i_{dc2}$:
modulating the first leg at a first duty cycle; and
clamping the second leg and the third leg to a negative voltage rail of the second inverter;
if $i_{b2} > i_{a2}$ and $i_{b2} \geq i_{c2}$ and $i_{b2} \geq i_{dc2}$:
modulating the second leg at a second duty cycle; and
clamping the first leg and the third leg to the negative voltage rail; and if $i_{c2} \geq i_{a2}$ and $i_{c2} > i_{b2}$ and $i_{c2} \geq i_{dc2}$:
  modulating the third leg at a third duty cycle; and
  clamping the first leg and the second leg to the negative voltage rail.

11. The method of claim 10, further comprising:
  determining a first inverter switching function; and
  modulating the first inverter according to the first inverter switching function.

12. The method of claim 11, wherein determining the first inverter switching function is based on a desired motor current and a second inverter switching function, such that voltage across a motor coupled to the first inverter and the second inverter is sinusoidal.

13. The method of claim 10, further comprising if $$\frac{I_p}{2} < |i_{dc2}|,$$

wherein $I_p$ is a required output current:
  if $i_{a2} \geq i_{b2}$ and $i_{a2} > i_{c2}$ and $i_{a2} < i_{dc2}$:
    clamping the first leg to a positive voltage rail of the second inverter;
    if $i_{b2} > 0$, clamping the third leg to the negative voltage rail and modulating the second leg at a duty cycle $$d_{b2} = \frac{i_{dc2} - i_{a2}}{i_{b2}};$$

and
    if $i_{c2} > 0$, clamping the second leg to the negative voltage rail and modulating the third leg at a duty cycle $$d_{c2} = \frac{i_{dc2} - i_{a2}}{i_{c2}};$$

if $i_{b2} > i_{a2}$ and $i_{b2} \geq i_{c2}$ and $i_{b2} < i_{dc2}$:
    clamping the second leg to the positive voltage rail;
    if $i_{a2} > 0$, clamping the third leg to the negative voltage rail and modulating the first leg at a duty cycle $$d_{a2} = \frac{i_{dc2} - i_{b2}}{i_{a2}};$$

and
    if $i_{c2} > 0$, clamping the first leg to the negative voltage rail and modulating the third leg at a duty cycle $$d_{c2} = \frac{i_{dc2} - i_{b2}}{i_{c2}};$$

and
  if $i_{c2} \geq i_{a2}$ and $i_{c2} > i_{b2}$ and $i_{c2} < i_{dc2}$:
    clamping the third leg to the positive voltage rail;
    if $i_{a2} > 0$, clamping the second leg to the negative voltage rail and modulating the first leg at a duty cycle $$d_{a2} = \frac{i_{dc2} - i_{c2}}{i_{a2}};$$

and
    if $i_{b2} > 0$, clamping the first leg to the negative voltage rail and modulating the second leg at a duty cycle $$d_{b2} = \frac{i_{dc2} - i_{c2}}{i_{b2}}.$$

14. The method of claim 13, wherein the first duty cycle is governed by the relationship $$d_{a2} = \frac{i_{dc2}}{i_{a2}}.$$

15. The method of claim 14, wherein the second duty cycle is governed by the relationship $$d_{b2} = \frac{i_{dc2}}{i_{b2}}.$$

16. The method of claim 15, wherein the third duty cycle is governed by the relationship $$d_{c2} = \frac{i_{dc2}}{i_{c2}}.$$

17. A method for controlling a double-ended inverter system having a first inverter and a second inverter, the method comprising:
  determining a required output current ($I_p$);
  determining a desired second inverter current ($i_{dc2}$);
  determining a second inverter switching function, wherein only a selected leg in the second inverter is modulated at a duty cycle;
  determining a first inverter switching function based on the second inverter switching function; and
  modulating the first inverter and the second inverter using the first inverter switching function and the second inverter switching function.

18. The method of claim 17, further comprising:
  if a first phase current ($i_{a2}$) associated with a first leg of the second inverter is greater than a second phase current ($i_{b2}$) associated with a second leg of the second inverter and is greater than and a third phase current ($i_{c2}$) associated with a third leg of the second inverter and is greater than or equal to the desired second inverter current:
    selecting the first leg; and
    clamping the second leg and the third leg to a negative voltage rail of the second inverter.

19. The method of claim 18, further comprising determining the duty cycle comprising the second inverter switching function by dividing the desired second inverter current by the first phase current.

20. The method of claim 18, further comprising if $$\frac{I_p}{2} < |i_{dc2}|:$$

if $i_{a2} \geq i_{b2}$ and $i_{a2} > i_{c2}$ and $i_{a2} < i_{dc2}$:
  clamping the first leg to a positive voltage rail of the second inverter;

if $i_{b2} > 0$, clamping the third leg to the negative voltage rail and modulating the second leg at a duty cycle $$d_{b2} = \frac{i_{dc2} - i_{a2}}{i_{b2}};$$

and if $i_{c2} > 0$, clamping the second leg to the negative voltage rail and modulating the third leg at a duty cycle $$d_{c2} = \frac{i_{dc2} - i_{a2}}{i_{c2}}.$$

* * * * *